United States Patent [19]

Moczygemba

[11] 4,152,370

[45] May 1, 1979

[54] PREPARATION, COMPOSITION, AND USE OF BLOCK POLYMERS

[75] Inventor: George A. Moczygemba, Bartlesville, Okla.

[73] Assignee: Phillips Petroleum Company, Bartlesville, Okla.

[21] Appl. No.: 876,436

[22] Filed: Feb. 9, 1978

[51] Int. Cl.² ............................................ C08F 297/04
[52] U.S. Cl. ................................................ 260/880 B
[58] Field of Search ...................................... 260/880 B

[56] References Cited

U.S. PATENT DOCUMENTS

| 3,670,054 | 6/1972 | De La Mare | 260/880 B |
| 4,086,298 | 4/1978 | Fahrbach | 260/880 B |

Primary Examiner—Paul R. Michl

[57] ABSTRACT

Linear block copolymers having the formula A-B/A'-C and C-B/A'-A are prepared, wherein terminal block A is a poly(monovinylarene) block, terminal block C is a block of low vinyl poly(1,3-butadiene), having less than about 30 mole percent vinyl pendant groups, and the center block B/A' is a block composed of monovinylarene monomer units and of monomer units of certain conjugated dienes. Center block B/A' has a tapered structure.

21 Claims, No Drawings

PREPARATION, COMPOSITION, AND USE OF BLOCK POLYMERS

FIELD OF THE INVENTION

This invention relates in one aspect to a composition of matter having the formula A-B/A'-C. In one aspect, it relates to the composition formed by hydrogenating such a linear copolymer. In another aspect, it relates to a method of preparing such a linear copolymer, as well as its hydrogenated derivative polymer. In still another aspect, it relates to an article of manufacture prepared from the hydrogenated derivative polymer. In a further aspect, it relates to a composition of matter having the formula C-B/A'-A. In a still further aspect, it relates to the composition formed by hydrogenating the copolymer C-B/A'-A. And in a still further aspect, it relates to a method of preparing the copolymer C-B/A'-A, as well as its hydrogenated derivative polymer. And in a final aspect, it relates to an article of manufacture prepared from the hydrogenated derivative copolymer C-B/A'-A.

BACKGROUND OF THE INVENTION

Polymers which exhibit high green tensile strength are important because such materials have high tensile strength without the necessity of curing the materials. When such polymers which possess substantial green tensile strength are hydrogenated, the resulting materials possess the additional advantage of having improved environmental resistance or stability, as compared to the unhydrogenated polymers. Materials which are within the classification of materials called thermoplastic elastomers are elastomeric (i.e., rubbery) and are thermoplastic (i.e., moldable with heat); and the scraps generated in fabricating various articles from such materials can be directly reclaimed and reused without the necessity of performing any degradative or other processing steps prior to reusing the scraps.

Thermoplastic elastomeric polymers which possess substantial green tensile strength can be used in the fabrication of belts, hoses, and various molded articles for application in automotive, medical, and houseware fields. Other important applications include the areas of protective coatings and adhesives, especially pressure-sensitive adhesive films applied as hot melt compositions.

STATEMENT OF THE INVENTION

According to the invention, a linear copolymer having the formula A-B/A'-C is prepared, wherein terminal block A is a block of poly(monovinylarene) prepared from at least one monovinylarene having 8 to about 16 carbon atoms per monomer unit, terminal block C is a block of poly(1,3-butadiene) having a low vinyl content (less than about 30 mole percent), and the center block B/A' is a block composed of units of at least one of said monovinylarenes which can be used to form block A, and of units of at least one conjugated diene monomer having 5 to about 12 carbon atoms per monomer unit, the center block B/A' having a tapered structure as described below. Also according to the invention, a linear copolymer having the formula C-B/A'-A is prepared, wherein terminal blocks C and A and center block B/A' are as described above. Also according to the invention, the linear copolymers are hydrogenated. The resulting copolymers can be used to produce articles of manufacture in which high green tensile strength is an important characteristic. In this invention with respect to block C, the term "vinyl content" refers to the mole percent of 1,2-polymerization of butadiene that can occur within the scope of this invention. Although good results are expected with a vinyl content in block C of up to 30 mole percent, a vinyl content less than about 15 mole percent is preferred so that block C will retain a resinous character. In this invention, it is highly desirable that tapered center block B/A' be formed essentially in the absence of any randomizer. However, if desired, a small amount of a randomizer may be present, being used as an initiation activator, provided that it does not significantly affect the formation of the tapered center block B/A'. For example, about 0.1 part tetrahydrofuran per hundred parts of total monomers may be present.

Since during the preparation of a tapered copolymer block, the tendency of the conjugated diene to be incorporated in a copolymer block greatly exceeds that tendency of the monovinylarene monomer, the composition of each copolymer block formed during copolymerization gradually changes from that of nearly pure poly(conjugated diene) to that of nearly pure poly(monovinylarene). Therefore, in each copolymer block there exist three regions which gradually pass into each other and which have no sharp boundaries. In one of the outer regions, the units derived from the conjugated diene monomer predominate, with only a small amount of units derived from the monovinylarene monomer; in the middle region, the relative amount of units derived from the monovinylarene monomer greatly increases and the relative amount of units derived from the conjugated diene monomer greatly decreases; and in the other outer region, the units derived from the monovinylarene monomer predominate, with only a small amount of units derived from the conjugated diene present. It is emphasized that the outer regions do not consist of one pure homopolymeric block of units derived from either monovinylarene monomer or conjugated diene monomer, but a few units of monovinylarene monomer or conjugated diene monomer are present therein. The structure A-B/A'-C is described herein as having a "reversed" tapered structure, whereas the structure C-B/A'-A is described herein as having a "normal" tapered structure.

PREFERRED EMBODIMENTS OF THE INVENTION

The structure A-B/A'-C, which is prepared according to the invention, has the characteristic that upon being hydrogenated, it has resinous end blocks A and C and a rubbery center block B/A'. Likewise, the structure C-B/A'-A, which is prepared according to the invention, also has that property. Unexpectedly, after it has been hydrogenated, the copolymer with structure A-B/A'-C exhibits higher green tensile strength than the copolymer with the structure C-B/A'-A after it has been hydrogenated.

Although the following description is written particularly in terms of using one monovinylarene monomer to form terminal block A and of using that same monovinylarene monomer and one conjugated diene to form the center tapered structure, block B/A', it is within the scope of this invention to use either the same or different monovinylarene monomer to form these blocks. Further, it is within the scope of this invention to form terminal block A from a mixture of those monovinylarenes which are designated herein as being suitable for forming terminal block A and/or to form center block B/A' from such a mixture of monovinylarenes. If mixtures of monovinylarenes are used to form block A and to form center block B/A', these mixtures may or may not be identical. Also, it is within the scope of this invention to form center block B/A' from a mixture of those conjugated dienes which are designated herein as being suitable for forming center block B/A'.

Monovinylarenes are employed as monomers in the preparation of the terminal block A and the tapered center block designated as B/A'. Styrene is the preferred monomer due to its relatively low cost and availability, but other monovinylarenes containing from 8 to about 16 carbon atoms per molecule can alternatively be employed. Examples of such monovinylarenes include α-methylstyrene, 3-methylstyrene, 4-n-propylstyrene, 3-chlorostyrene, 4-ethoxystyrene, 1-vinylnaphthalene, 4-cyclohexylstyrene, and p-tolylstyrene.

Conjugated dienes which polymerize to give a branched structure are also used in the preparation of the tapered center block designated as B/A'. As used herein, in contradistinction to its use to mean a radial polymeric structure, the term "branched structure" is meant to describe the presence of short (1 to about 8 carbon atoms) alkyl, alkenyl or aryl radicals on the linear polymer backbone which result from the incorporation of the conjugated diene in the polymer molecule. At least one of said $C_1$ to $C_8$ alkyl, alkenyl or aryl radicals is formed for each conjugated diene monomer unit incorporated in the polymer molecule. Hydrogenation of poly(branched conjugated diene) blocks does not result in resinous blocks as is the case with linear diolefin blocks; but rather they retain the rubbery character of the unhydrogenated blocks. Isoprene is a preferred monomer for preparing the poly(branched conjugated diene) blocks for the instant invention due to its availability. Suitable alternatives to isoprene are conjugated dienes which contain from 5 to about 12 carbon atoms per molecule, such as 2,3-dimethyl-1,3-butadiene, piperylene, 1,3-decadiene, 3-butyl-1,3-oxtadiene, and 2-phenyl-1,3-butadiene.

1,3-Butadiene is employed in the preparation of the terminal block C. Use of 1,3-butadiene provides for maximum linearity, i.e., minimum amount of side chains. This factor is believed to be important in providing a structure capable of forming resinous aggregates upon hydrogenation. (The small vinyl content which forms unavoidably in organolithium-initiated 1,3-butadiene polymerization does not prevent thermoplastic elastomeric performance on the part of the hydrogenated derivative polymers.)

Suitable polymerization initiators are the organomonolithium compounds of the formula RLi wherein R is a hydrocarbon radical selected from the group consisting of aliphatic, cycloaliphatic, and aromatic radicals. Said radicals contain from 1 to about 20 carbon atoms. Examples of suitable organolithium compounds include methyllithium, isopropyllithium, n-butyllithium, sec-butyllithium, t-octyllithium, n-dodecyllithium, n-eicosyllithium, phenyllithium, 1-naphthyllithium, p-tolyllithium, 4-phenylbutyllithium, cyclohexyllithium, and 4-cyclohexylbutyllithium. The amount of organolithium initiator employed depends upon the desired molecular weight of the polymer but is normally in the range of about 0.1 to about 100 millimoles per 100 grams of total monomers. If a higher molecular weight is desired, a relatively small amount of initiator within this range will be used; whereas, if a lower molecular weight is desired, a relatively large amount within this range will be used.

The polymerization process of this invention is usually carried out in the presence of a diluent. Suitable diluents are hydrocarbon solvents which are not detrimental to the polymerization process, which include paraffinic, cycloparaffinic, and aromatic hydrocarbon solvents, and mixtures thereof. Examples of such solvents include n-hexane, n-heptane, 2,2,4-trimethylpentane, cyclopentane, cyclohexane, benzene, toluene, and the xylenes. The quantity of diluent employed can be varied broadly. A typical operation would, for example, employ the diluent in a quantity (by weight) of about 5 to about 10 times the weight of all the monomers used.

It is recommended that the polymers of this invention be synthesized by sequential monomer addition. The polymerization process for producing the polymer having the reverse tapered structure A-B/A'-C involves the addition of an initiator to a polymerization zone normally containing both diluent and the monovinylarene monomer. Following completion of the polymerization of the monovinylarene, wherein the poly(monovinylarene) living polymer is formed, generally the total amounts of the conjugated diene and monovinylarene monomers used to form the tapered center block B/A' are charged at least substantially simultaneously either as a mixture or separately to the solution of the poly(monovinylarene) living polymer to add the tapered conjugated diene/monovinylarene block. In this step, a poly(monovinylarene)-tapered poly(branched conjugated diene/monovinylarene) living polymer is formed. Lastly, 1,3-butadiene is charged to provide a low vinyl polybutadiene block, having less than about 30 mole percent vinyl content and preferably less than 15 mole percent vinyl content forming a poly(monovinylarene)-tapered poly(branched conjugated diene/monovinylarene)-low vinyl poly(1,3-butadiene) living polymer. At the conclusion of butadiene polymerization, polymerization is terminated by means described below; and one can then recover the unhydrogenated parent polymer.

As an alternative to the above-described procedure, in the special case wherein a reverse tapered structure A-B/A'-C is to be formed and wherein the monovinylarene monomer or monomer mixture used to form block A is identical to that monovinylarene monomer or monomer mixture used to form tapered center block B/A', the following procedure can be used. All of the monovinylarene monomer or monomer mixture needed to form both block A and tapered center block B/A' can be initially charged to the polymerization zone. After block A has formed, the conjugated diene monomer or monomer mixture used to form tapered center block B/A' can be added to the polymerization zone containing block A and unpolymerized monovinylarene monomer or monomer mixture to form the tapered center block B/A'. Thereafter, 1,3-butadiene is charged as described above. Obviously, as a variation of the alternative just described, an amount of monovinylarene monomer or monomer mixture greater than that needed to form block A but less than that needed to form both blocks A and B/A' can be initially charged; and the remainder needed to form block B/A' can be charged after block A has formed but essentially simultaneously with the conjugated diene monomer or monomer mixture used to form tapered center block B/A'.

The polymerization process for producing the polymer having the normal tapered structure C-B/A'-A is identical to the general procedure described above for the reverse tapered structure, except that 1,3-butadiene is charged first, then the amounts of conjugated diene and monovinylarene monomer units are charged, and finally the monovinylarene monomer is charged last. Again, polymerization is terminated as described below; and one can then recover that unhydrogenated parent polymer.

Below in table form are given the approximate broad and preferred ranges for the parts by weight of each monomer per hundred parts by weight of total monomers.

|  | 1,3-Butadiene, C | $C_5$-$C_{12}$ Conjugated Diene, B | Monovinylarene, A | |
|---|---|---|---|---|
|  |  |  | Center Block | Terminal Block |
| Broad | 5–50 | 10–89 | 1–50 | 5–50 |
| Preferred | 10–35 | 20–80 | 5–25 | 5–30 |

In the preparation of the poly(1,3-butadiene) block (block C), no agent is normally employed which would promote 1,2-polymerization. If such a vinyl promoting agent is used, the amount used should not result in the formation of greater than about 15 mole percent vinyl pendant groups. As a result, the extent to which such 1,2-polymerization occurs will be within the range of about 1 to about 15 mole percent; and preferably will be less than about 15 mole percent.

The weight average molecular weight of the polymer will generally range broadly from about 1,000 to about 1,000,000 and will range preferably from about 50,000 to about 400,000. However, variances from the above molecular weight range may be practiced to meet unusual end-use requirements; and these are also within the scope of this invention.

The polymerization time for each monomer charge will generally range broadly from about a few minutes to about 6 hours and will range preferably from about 10 minutes to about 2 hours.

The polymerization temperature (in °C) for each polymerization step will generally range broadly from about −15° to about 150° and will range preferably from about 40° to about 90°.

Various materials are known to be detrimental to the initiator system employed in preparing the polymers of this invention. These materials include carbon dioxide, oxygen and water. It is usually desirable, therefore, that the reactants and diluents be free of these materials, as well as of any other detrimental materials which may tend to inactivate the initiator. Furthermore, it is desirable to remove air and moisture from the reaction vessel in which the polymerization is to be conducted.

Upon completion of the polymerization, in one embodiment, the polymerization mixture can be treated to destroy carbon-lithium bonds (i.e., terminate the polymerization) and to recover the rubbery polymers. In this embodiment, the parent polymers described above are isolated, or they can be directly hydrogenated to produce the corresponding derivative copolymer. A suitable method for isolating the parent polymer involves, for example, steam stripping the diluent from the polymer. In another suitable method, a material that will destroy carbon-lithium bonds (such as an alcohol) is added to the mixture so as to destroy such bonds and cause coagulation of the polymer. The polymer is then separated from alcohol and diluent by any suitable means, such as decantation or filtration. It has been found to be advantageous to add an antioxidant such as, for example 2,6-di-t-butyl-4-methylphenol, to the polymer solution prior to the recovery of the polymer. The amount and type added will depend on the end use of the polymer and the selection will be left to one skilled in the art.

If a parent polymer has been isolated, it can be hydrogenated as follows. It can be redissolved in a suitable hydrocarbon solvent, such as, for example, in those described as diluents above, to give a substantially homogenous solution; and the hydrogenation catalyst can be added to and hydrogenation conducted on this solution.

Alternatively (instead of the just-described polymer termination and isolation step), in a preferred embodiment, the parent polymer is not isolated; and a hydrogenation catalyst (described below) is added to the mixture obtained by polymerization, with hydrogenation and isolation of the hydrogenated copolymer then being carried out as described below.

The polymers of this invention can be hydrogenated to effectively remove the olefinic unsaturation without removing substantial amounts of aromatic unsaturation. The percentage of total olefinic double bonds removed by hydrogenation may vary broadly from about 10 to 100 percent and preferably varies from about 70 to 100 percent.

Hydrogenation can be effected in the presence of a variety of catalyst systems of either the heterogeneous or homogenous type. Examples of suitable heterogeneous catalyst systems include nickel or keiselguhr, Raney Nickel, copper-chromium oxide, molybdenum sulfide, and finely divided platinum or noble metals on suitable carriers. Homogeneous catalysts are preferred, however, and the latter can be prepared by reducing a cobalt, nickel, or iron carboxylate or alkoxide with an alkyl aluminum compound. An example of a preferred homogenous catalyst is that formed through the reduction of nickel octoate (nickel $C_8$ carboxylate) by triethylaluminum. The polymer, preferably in solution in an inert solvent, is contacted with the catalyst under conditions which include temperatures in the range from about 0° to about 250° C. and pressurization with hydrogen up to a total pressure of about 7,000 kPa. When treating the polymer in solution, a suitable pressure is that pressure sufficient to maintain the reaction mixture substantially in the liquid phase. The reaction time can vary from about 1 min. to about 25 hours or more. Preferred conditions involve temperatures of about 10° to about 200° C., pressures of about 70 to about 3,500 kPa, and reaction times of about 10 minutes to about 10 hours.

Following the hydrogenation reaction, the hydrogenated polymer can be isolated by conventional techniques. For example, the catalyst components can be converted to water soluble salts and washed from the polymer solution. An antioxidant (such as for example 2,6-di-t-butyl-4-methylphenol) can be added if desired, followed by coagulation of the polymer, filtration or decantation to isolate the polymer, and finally removal of residual solvent under reduced pressure.

Compounding ingredients, such as fillers, dyes, pigments, softeners, and reinforcing agents can be used especially with the polymers of this invention in compounding operations to produce a variety of useful products. For example, they can be blended, either in the melt or in solution, with adhesive composition additives such as tackifiers, plasticizers, and antioxidants, among others. The hydrogenated polymers having the reverse tapered structure are especially useful in these operations because of the high green tensile strength which they afford.

Although curing is not normally considered necessary for thermoplastic elastomers, it is within the scope of this invention to cure the unhydrogenated parent polymers of this invention by employing any suitable curing method. For example, vulcanization additives, such as for example peroxides, or sulfur plus accelerators can be added in any suitable manner. Furthermore, although hydrogenated polymers are not typically thought of as being curable, these polymers also can be cured especially with peroxide type curing agents.

EXAMPLES

Preparation of Block Copolymers

Polymers of structure A-B/A'-C, having reversed tapered center blocks, were prepared according to Recipe 1. Polymers of structure C-B/A'-A, having a normal tapered center block, were prepared according to Recipe 2.

Recipe 1

Recipe for Polymers Having Reverse Tapered Center Blocks

| Step I | Polymer Identification | | | |
|---|---|---|---|---|
| | D | E | F | G |
| Cyclohexane, parts by weight | 312 | 312 | 312 | 312 |
| Sec.-Butyllithium, mhm[a] | 1.1 | 1.5 | 1.1 | 1.5 |
| Styrene, parts by weight | 9 | 9 | 9 | 9 |
| Polymerization time, minutes | 50 | 50 | 50 | 50 |
| Polymerization temperature, ° C. | 70 | 70 | 70 | 70 |
| Step II | | | | |
| Isoprene, parts by weight | 27 | 27 | 30 | 30 |
| Styrene, parts by weight | 9 | 9 | 6 | 6 |
| Polymerization time, minutes | 50 | 50 | 50 | 50 |
| Polymerization temperature, ° C. | 70 | 70 | 70 | 70 |
| Step III | | | | |
| 1,3-Butadiene, parts by weight | 15 | 15 | 15 | 15 |
| Polymerization time, minutes | 50 | 50 | 50 | 50 |
| Polymerization temperature, ° C. | 70 | 70 | 70 | 70 |

[a]Mhm=millimoles per 100 grams of total monomers added in all steps of recipe.

Recipe 2

Recipe for Polymers Having Normal Tapered Center Blocks

| Step I | Polymer Identification | | | |
|---|---|---|---|---|
| | H | I | J | K |
| Cyclohexane, parts by weight | 312 | 312 | 312 | 312 |
| Sec.-Butyllithium, mhm[a] | 1.1 | 1.5 | 1.1 | 1.5 |
| 1,3-Butadiene, parts by weight | 15 | 15 | 15 | 15 |
| Polymerization time, minutes | 50 | 50 | 50 | 50 |
| Polymerization temperature, ° C. | 70 | 70 | 70 | 70 |
| Step II | | | | |
| Isoprene, parts by weight | 27 | 27 | 30 | 30 |
| Styrene, parts by weight | 9 | 9 | 6 | 6 |
| Polymerization time, minutes | 50 | 50 | 50 | 50 |
| Polymerization temperature, ° C. | 70 | 70 | 70 | 70 |
| Step III | | | | |
| Styrene, parts by weight | 9 | 9 | 9 | 9 |
| Polymerization time, minutes | 50 | 50 | 50 | 50 |
| Polymerization temperature, ° C. | 70 | 70 | 70 | 70 |

[a]Mhm=millimoles per 100 grams of total monomers added in all steps of recipe.

Polymerizations were carried out employing essentially anhydrous reagents and conditions under an inert atmosphere (nitrogen) in 26-ounce beverage bottles equipped with a perforated crown cap over a self-sealing rubber gasket. Diluent, initiator, and the appropriate Step I monomer were charged initially and allowed to polymerize. For each run, after the stipulated polymerization time, the total amounts of Step II monomers were added separately but essentially simultaneously in the order shown above, followed by Step III monomer after the designated time interval. Following the completion of Step III, 2,6-di-t-butyl-4-methylphenol (1 part by weight per 100 parts of total monomers) was added in a 50/50 (by volume) toluene/isopropyl alcohol solution; and the polymer was recovered by adding the polymerization mixture to isopropyl alcohol. The coagulated polymer was collected by filtration and dried under reduced pressure. Physical properties of parent polymers (prior to hydrogenation) having reversed tapered and normal tapered center blocks are shown in Table I.

Both of these parent polymers were then hydrogenated in the following way. A reduced nickel hydrogenation catalyst was prepared by the following procedure: a 6 weight percent solution of nickel octoate (nickel $C_8$ carboxylate) in cyclohexane was treated with a solution of triethylaluminum in cyclohexane in quantities sufficient to give an aluminum/nickel molar ratio of 2.7/1.

Fifty grams of parent polymer dissolved in 500 grams of cyclohexane were introduced into a ½ gallon capacity glass reactor. The reactor and its contents were purged thoroughly with nitrogen prior to addition of reduced nickel solution, which was added in an amount sufficient so that the mixture contained 0.50 part by weight nickel per 100 parts by weight parent polymer. With continuous stirring, hydrogen was added at 345 kPa pressure at a starting temperature of 30° C. Upon introduction of the hydrogen, the temperature rose to about 50° C. in 2 to 3 minutes; and then it was raised to 70° C. over 5 to 10 minutes and maintained at this temperature for the duration of the 2 hour hydrogenation reaction. The reaction mixture was then treated with water (50–100 ml) to deactivate the catalyst. Oxygen was then added and the mixture was stirred at 70° C. until the mixture changed to a light gray or green color. The reaction mixture was washed with a 10 percent aqueous solution of phosphoric acid and ammonium phosphate (1:4 weight ratio) and then washed with water. Following the water wash, 2,6-di-t-butyl-4-methylphenol (0.5 parts by weight per 100 parts of parent polymer) was added in about 10 ml of a 50/50 (by volume) toluene/isopropyl alcohol solution. The hydrogenated polymer was isolated by coagulation with isopropyl alcohol and dried under reduced pressure at 50° C.

Properties of the hydrogenated polymers are shown in Table II.

Table I

Physical Properties of Parent Block Copolymers Having Reverse Tapered and Normal Tapered Center Blocks (Prior to Hydrogenation)

| | Polymer Identification[a] | | | | | | | |
|---|---|---|---|---|---|---|---|---|
| | Reverse Tapered | | | | Normal Tapered | | | |
| | D | E | F | G | H | I | J | K |
| Inherent viscosity[b] | 1.11 | 0.81 | 1.06 | 0.82 | 1.08 | 0.74 | 1.12 | 0.82 |
| Molecular weight, $M_w$[c] | 120,000 | 91,000 | 126,000 | 91,000 | 136,000 | 105,000 | 133,000 | 92,000 |
| Molecular weight, $M_n$[c] | 73,000 | 63,000 | 79,000 | 62,000 | 105,000 | 83,000 | 100,000 | 74,000 |
| Block styrene, % by weight[d] | 23.9 | 23.2 | 21.0 | 18.5 | 23.6 | 22.4 | 20.4 | 20.4 |

[a]Compositions and structures as described in Recipes 1 and 2.
[b]Inherent viscosity was determined according to the procedure given in U.S. Patent 3,278,508, column 20, Note a, with the modification that the solution was not filtered through a sulfur absorption tube but rather a sample of the solution was filtered through a fritted glass filter stick of grade C porosity and pressured directly into the viscometer.
[c]Molecular weights were determined from gel permeation chromatography curves by a procedure described by Gerard Kraus and C. J. Stacy, J. Poly. Sci.: Symposium 43, 329–343 (1973).
[d]Determined using oxidative degradation procedure based on I. M. Kolthoff, T. S. Lee, and C. W. Carr, J. Poly. Sci. 1, 429 (1946).

Table II

Properties of Hydrogenated Block Copolymers

| | Polymer Identification | | | | | | | |
|---|---|---|---|---|---|---|---|---|
| | Reverse Tapered | | | | Normal Tapered | | | |
| | L | M | N | O | P | Q | R | S |
| Unhydrogenated parent polymer[a] | D | E | F | G | H | I | J | K |
| % Unsaturation, ICl[b] | 0.87 | 1.11 | 0.88 | 0.94 | 0.94 | 1.50 | 0.95 | 1.76 |
| Melt flow[c] | 0 | 0 | 0 | 0.39 | 0.05 | 1.7 | 0.04 | 2.0 |
| Tensile (23° C.), MPa[d] | 16.8 | 26.9 | 13.2 | 13.2 | 11.8 | 9.0 | 11.6 | 8.6 |
| Elongation (23° C.), %[d] | 450 | 690 | 440 | 670 | 650 | 460 | 600 | 470 |
| 300% Modulus (23° C.), MPa[d] | 8.3 | 7.2 | 7.4 | 7.0 | 7.9 | 7.7 | 7.2 | 6.8 |
| Tensile set (23° C.), % after 300% Elongation | 34 | (g) | 27 | 21 | 27 | 22 | 21 | 18 |
| Hardness, Shore A[f] | 83 | 78 | 80 | 79 | 83 | 80 | 76 | 76 |

[a]Compositions and structures as given in Recipes 1 and 2.
[b]Determined according to procedure described in U.S. 3,299,016, column 9, lines 55ff.
[c]Melt flow as g./10 minutes at 190° C. using 21.6 kg. weight ASTM-1238.
[d]ASTM D412-75
[e]ASTM D412-75 modified by holding at 300% elongation for 1 minute instead of the specified 10 minutes.
[f]ASTM D2240-68.
[g]Test specimen broke during testing.

Both the hydrogenated copolymer having the reverse tapered structure A-B/A'-C and the hydrogenated copolymer having the normal tapered structure C-B/A'-A have good green tensile properties. However, in comparing the hydrogenated, uncured copolymers having the reverse tapered structure A-B/A'-C of the instant invention with hydrogenated, uncured copolymers having the normal tapered structure C-B/A'-A of the instant invention, i.e., comparing polymers L with P, M with Q, N with R, and O with S, one observes that tensile strengths of the hydrogenated polymers having the reverse tapered center block are unexpectedly significantly higher than the tensile strengths of the corresponding polymers having the normal tapered center block; and they are on the average about 77 percent higher. It should be noted that the tensile strengths were green tensile strengths (i.e., no curing was done on the hydrogenated copolymers before tensile strengths were measured).

What is claimed is:

1. The group of linear block copolymers comprising the copolymers represented by the formulas A-B/A'-C and C-B/A'-A wherein A is a poly(monovinylarene) block made up of monovinylarene monomer units having 8 to about 16 carbon atoms per monomer unit, C is a low vinyl poly(1,3-butadiene) block having less than about 30 mole percent pendant vinyl groups and being made up of polymerized 1,3-butadiene monomer units, and B/A' is a tapered block prepared from units of at least one monovinylarene monomer having 8 to about 16 carbon atoms per monomer unit and units of at least one conjugated diene monomer having 5 to about 12 carbon atoms per monomer unit.

2. A polymer formed when a polymer according to claim 1 is terminated, recovered and hydrogenated.

3. A polymer according to claim 2 wherein A is a polystyrene block, and B/A' is composed of polymerized styrene and isoprene, and wherein block C has a vinyl content less than about 15 mole percent.

4. A method of producing a copolymer comprising:
   (a) charging at least one monovinylarene monomer having 8 to about 16 carbon atoms per monomer unit to a polymerization zone and polymerizing said monovinylarene monomer to form a block A of poly(monovinylarene);
   (b) next, charging at least one monovinylarene monomer having 8 to about 16 carbon atoms per monomer unit and at least one conjugated diene monomer having 5 to about 12 carbon atoms per monomer unit to said polymerization zone and copolymerizing said monovinylarene monomer and said conjugated diene monomer to add to block A a tapered block B/A' formed of units of said conjugated diene and of said monovinylarene;
   (c) and then charging 1,3-butadiene to said polymerization zone and polymerizing said 1,3-butadiene to add to said tapered block B/A' a block of low vinyl poly(1,3-butadiene) having less than about 30 mole percent vinyl content.

5. A method according to claim 4 wherein the conjugated diene and the monovinylarene used to form said tapered center block are isoprene and styrene.

6. A method wherein a copolymer formed according to the method of claim 4 is hydrogenated after it has been formed.

7. A copolymer prepared according to the method of claim 4.

8. A method of producing a polymer comprising:
(a) charging 1,3-butadiene to a polymerization zone under polymerization conditions to form a block of poly(1,3-butadiene) having less than about 30 mole percent vinyl content;
(b) next, charging to said polymerization zone at least one monovinylarene monomer having 8 to about 16 carbon atoms per monomer unit and at least one conjugated diene monomer having 5 to about 12 carbon atoms per monomer unit under polymerization conditions to add to said poly(1,3-butadiene) block a tapered block formed of units of said conjugated diene monomer and of said monovinylarene monomer units,
(c) next, charging at least one monovinylarene monomer having 8 to about 16 carbon atoms per monomer unit to said polymerization zone under polymerization conditions to add onto said tapered block a block of poly(monovinylarene).

9. A method according to claim 8 wherein the conjugated diene and the monovinylarene monomers used to form said tapered center block are isoprene and styrene.

10. A method wherein a copolymer formed according to claim 8 is terminated and hydrogenated after it has been formed.

11. A copolymer prepared according to the method of claim 8.

12. An article of manufacture prepared from a composition according to claim 2.

13. An article of manufacture prepared from a composition according to claim 3.

14. An article of manufacture prepared from a composition prepared according to claim 6.

15. An article of manufacture prepared from a composition prepared according to claim 10.

16. An article of manufacture prepared from a composition prepared according to claim 11.

17. A polymer according to claim 1 wherein said polymer is represented by the formula A-B/A'-C.

18. A polymer formed when a polymer according to claim 17 is terminated, recovered, and hydrogenated.

19. A polymer according to claim 1 wherein said block C has a vinyl content less than about 15 mole percent.

20. A polymer according to claim 17
wherein the monomer employed for the C block is 1,3-butadiene in an amount within the range of about 5 to about 50 parts by weight per hundred parts by weight of total monomers used to prepare the polymer;
wherein the monomers employed for the B/A' block are (a) at least one monovinylarene monomer having 8 to about 16 carbon atoms per monomer unit in an amount within the range of about 1 to about 50 parts by weight per hundred parts by weight of total monomers used to prepare the polymer, and (b) at least one conjugated diene monomer having 5 to about 12 carbon atoms per monomer unit in an amount within the range of about 10 to about 89 parts by weight per hundred parts by weight of total monomers; and
wherein the monomer employed for the A block is at least one monovinylarene monomer having 8 to about 16 carbon atoms per monomer unit in an amount within the range of about 5 to about 50 parts by weight per hundred parts by weight of total monomers used to prepare the polymer.

21. A polymer according to claim 17
wherein the monomer employed for the C block is 1,3-butadiene in an amount within the range of about 10 to about 35 parts by weight per hundred parts by weight of total monomers used to prepare the polymer;
wherein the monomers employed for the B/A' block are (a) at least one monovinylarene monomer having 8 to about 16 carbon atoms per monomer unit in an amount within the range of about 5 to about 25 parts by weight per hundred parts by weight of total monomers used to prepare the polymer, and (b) at least one cojugated diene monomer having 5 to about 12 carbon atoms per monomer unit in an amount within the range of about 20 to about 80 parts by weight per hundred parts by weight of total monomers; and
wherein the monomer employed for the A block is at least one monovinylarene monomer having 8 to about 16 carbon atoms per monomer unit in an amount within the range of about 5 to about 30 parts by weight per hundred parts by weight of total monomers used to prepare the polymer.

* * * * *